Dec. 29, 1964   K. A. HUTCHINS ETAL   3,162,894
STUFFING APPARATUS FOR VISCOUS MATERIALS
Original Filed March 6, 1961   6 Sheets-Sheet 2
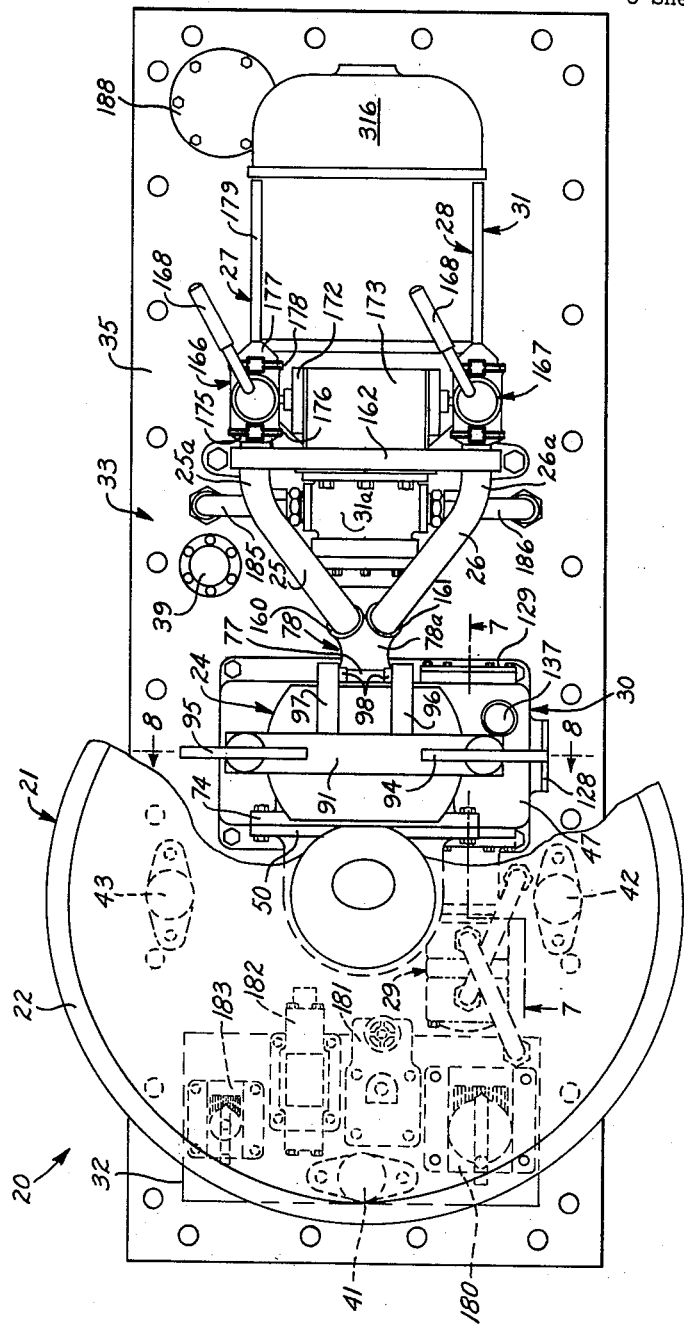
Fig-2-
INVENTORS
Floyd M. Adkins, Bertie S. Harington, Sr.
Kenneth A. Hutchins, Ralph W. Illsley
BY
Mason, Kolehmainen,
Rathburn + Wyss.
Attys:

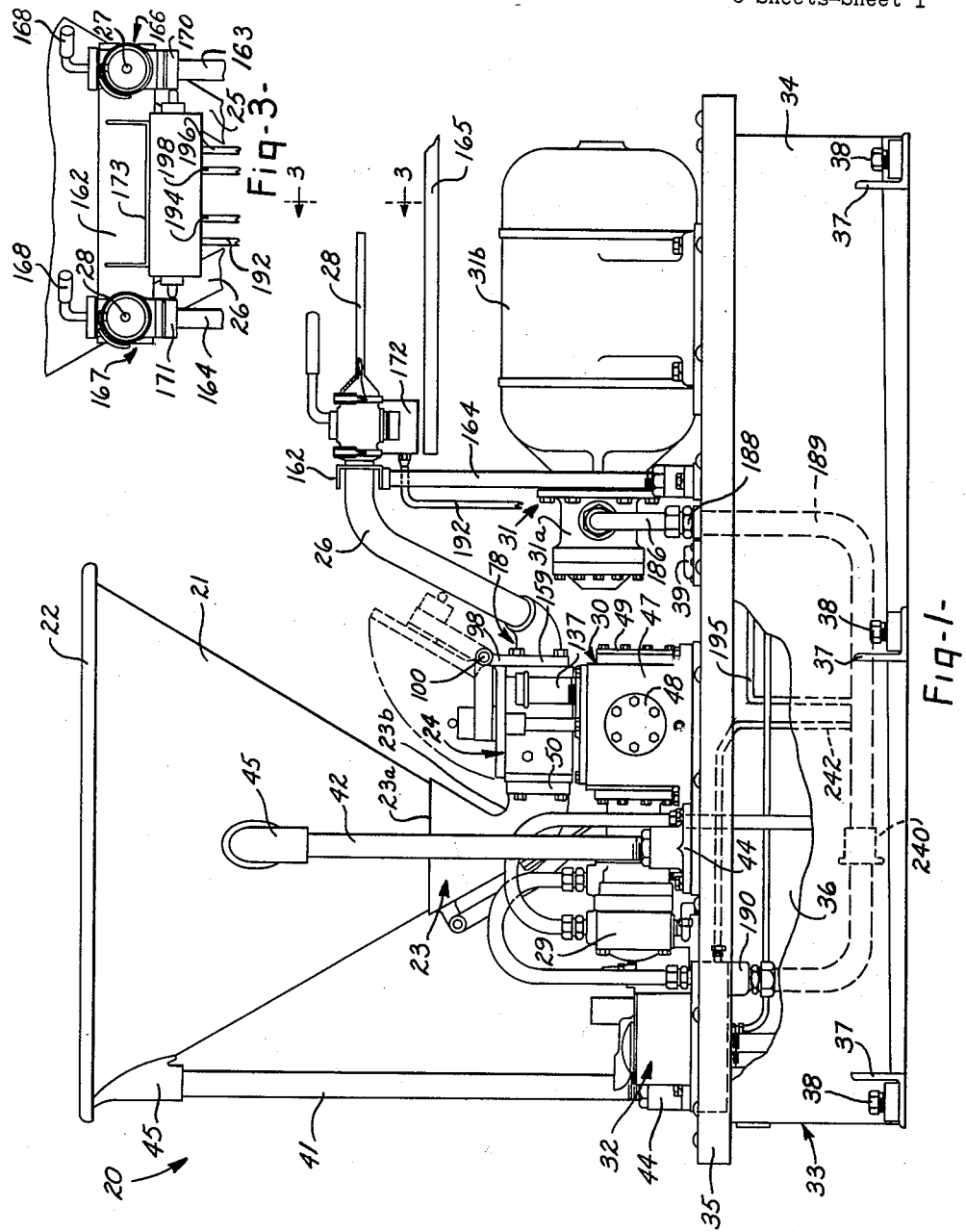

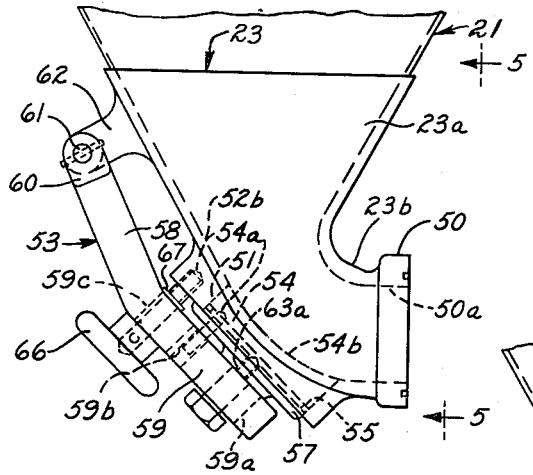
Fig-4-
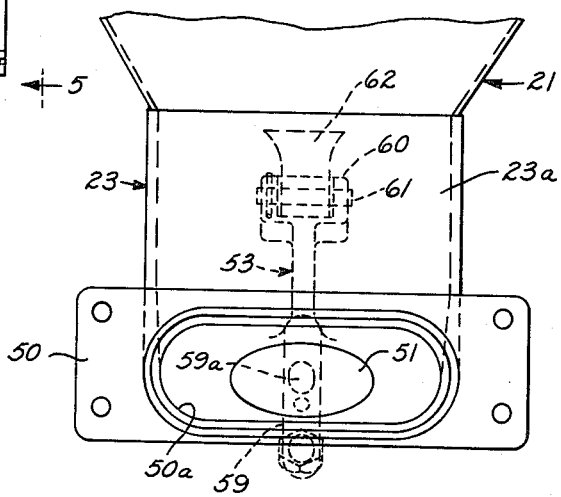
Fig-5-
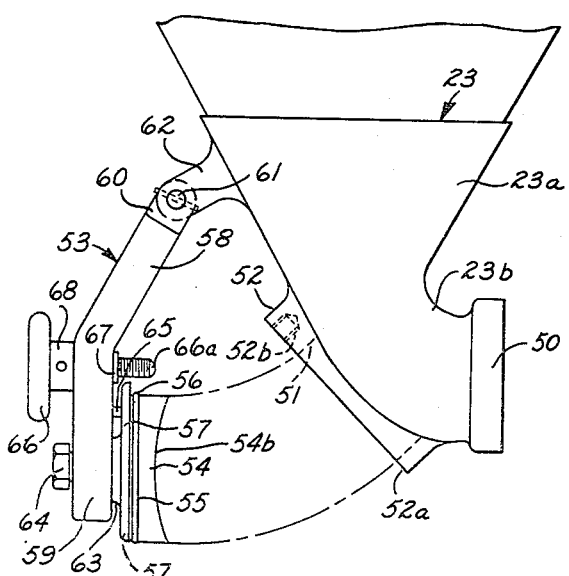
Fig-6-

Dec. 29, 1964   K. A. HUTCHINS ETAL   3,162,894
STUFFING APPARATUS FOR VISCOUS MATERIALS
Original Filed March 6, 1961   6 Sheets-Sheet 4
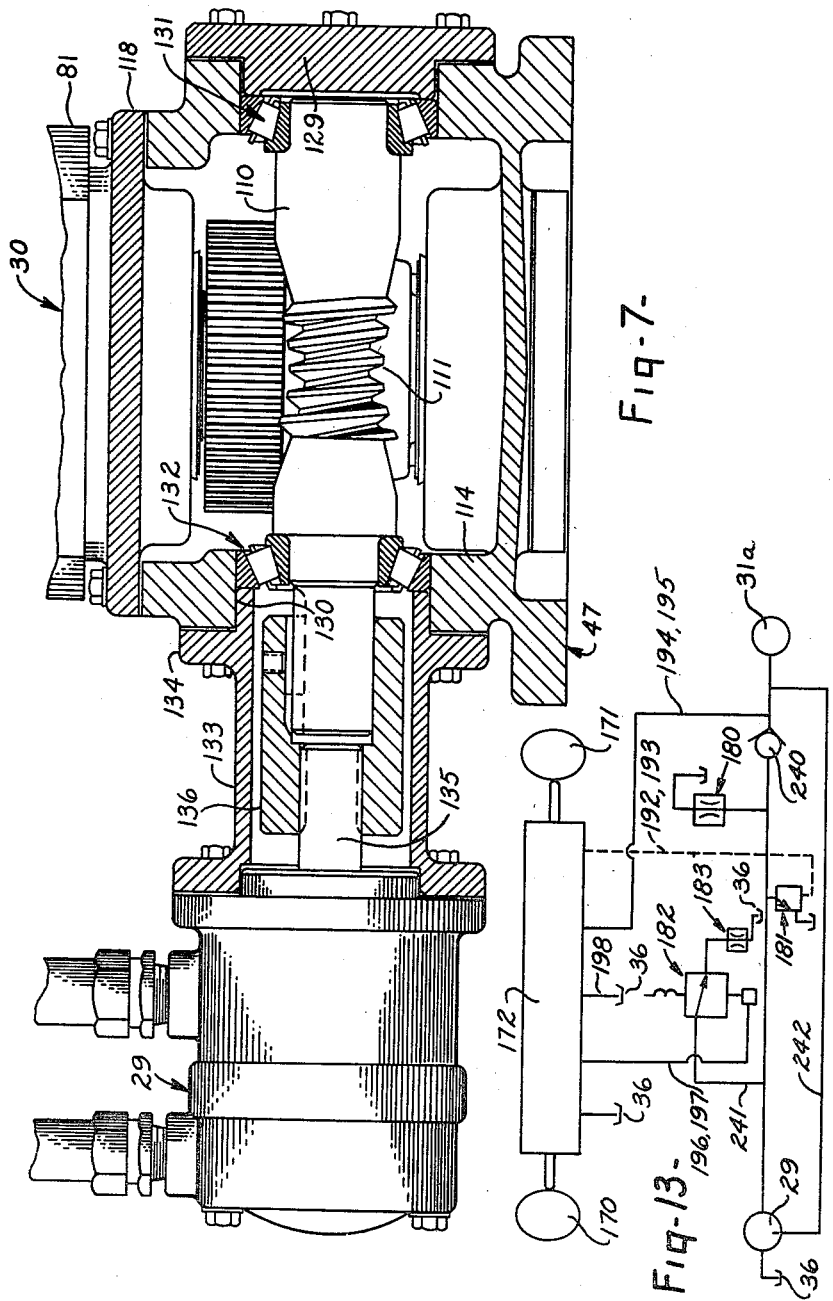
INVENTORS
Floyd M. Adkins, Bertie S. Harrington, Sr.
Kenneth A. Hutchins, Ralph W. Illsley
BY
Mason, Kolehmainen
Rathburn & Wyss
attys.

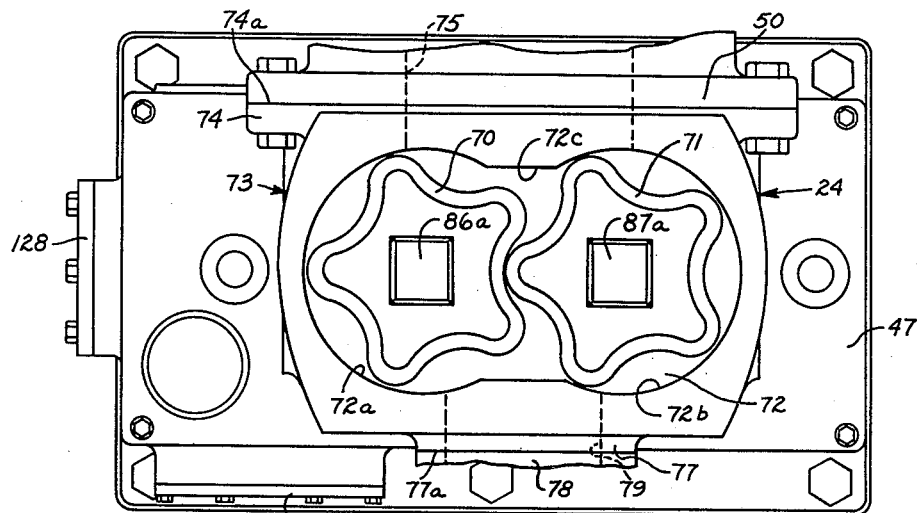
Fig-9-
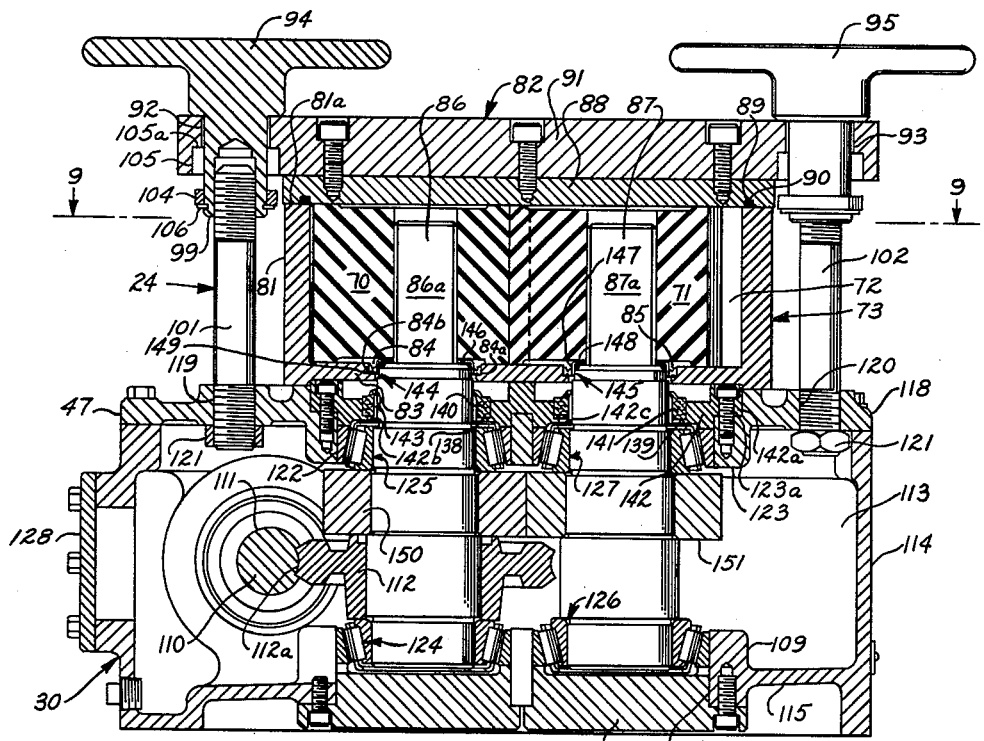
Fig-8-

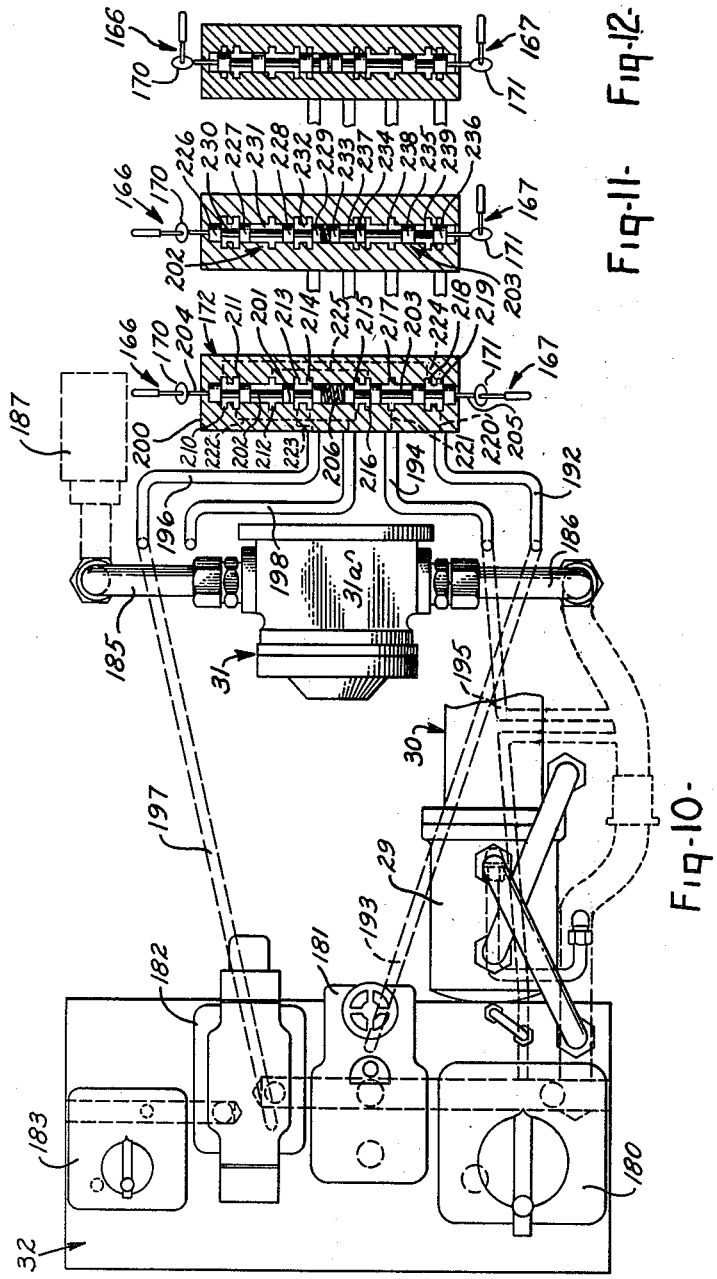

United States Patent Office 3,162,894
Patented Dec. 29, 1964

3,162,894
STUFFING APPARATUS FOR VISCOUS
MATERIALS
Kenneth A. Hutchins, Fort Wayne, Ind., Bertie S. Harrington, Sr., Chattanooga, Tenn., Floyd M. Adkins, Chicago, Ill., and Ralph W. Illsley, Harbor Bluffs, Largo, Fla., assignors to Chemetron Corporation, Chicago, Ill., a corporation of Delaware
Continuation of application Ser. No. 110,284, Mar. 6, 1961. This application Feb. 3, 1964, Ser. No. 341,972
19 Claims. (Cl. 17—35)

The present invention relates generally to a continuous stuffer for viscous materials such as food products and is more particularly concerned with apparatus for use in feeding ground, mixed or comminuted meat and meat products into suitable casings or other containers, although its use is not limited to this particular environment.

This is a continuation of patent application Serial No. 110,284, filed March 6, 1961, now abandoned.

Most of the devices presently available for feeding meat products are of the type employing a piston mounted for sliding movement within a cylinder and acting upon the meat products contained therein to force these products through a stuffing nozzle into the casing. Such devices are limited to batch operation since the cylinder must be refilled as soon as the piston has completed its stroke in exhausting the material. The replenishment of the meat products is a laborious and time consuming operation since it occasionally involves the necessity of retracting the piston and, as a result, gives rise to a relatively slow rate of production from the stuffing machine.

While continuous stuffers have been proposed for overcoming the aforementioned disadvantages of the batch type operation, these continuous stuffers have not been altogether successful since they give rise to a number of disadvantages. For example, it is often desirable to discharge meat products through more than one discharge nozzle or stuffing horn both for the purpose of speeding up the production and for more effectively utilizing the personnel available to operate the machine. Prior to the present invention, continuously operating stuffers did not lend themselves readily to multiple discharge operation since attempts to discharge through more than one nozzle have resulted in a number of problems arising from variations in the pressure and/or the rate of flow of the meat product delivered. Thus, if all of the nozzles of the system are discharging simultaneously, a large volume of meat products is required to maintain a relatively large rate of production, a result which is highly undesirable. If, on the other hand, only some of the nozzles are opened, the volume of meat products required must be relatively low in order to avoid a buildup in the pressure of these products to a value sufficient to rupture the casing with obvious ill effects. One of the principal objects of the present invention is, therefore, to provide a continuous stuffing apparatus having a plurality of discharge nozzles or stuffing horns with the flow of meat products from a single receiving chamber to these nozzles being regulated to correspond with the desired discharge conditions.

Another object of the invention is to provide a continuous stuffing apparatus of the character described above having a plurality of discharge nozzles the flow through each of which is controlled by a manually operated valve with the valves being effective to control automatically the rate of delivery of meat products from the receiving chamber to the nozzles.

A further object of the invention is to provide a continuous stuffing apparatus of the character indicated above which is automatically controlled by the discharge valve in such manner that the meat is stuffed into the casing under predetermined pressure.

The invention has for another object the provision of a new and improved pumping apparatus for use in a continuous stuffing machine to deliver comminuted meat products from a receiving chamber to one or more discharge nozzles.

A still further object of the invention is to provide continuous stuffing apparatus of the character described above which may be easily cleaned at the end of a run and which may be readily disassembled to permit thorough cleaning of the various components for sanitary purposes.

A still further object of the present invention is to provide a continuous stuffing apparatus in which the receiving chamber or inlet hopper is of minimum height so that the comminuted meat products to be stuffed may be easily loaded therein.

In accordance with the present invention, the foregoing and other objects are realized by providing a continuous stuffing apparatus employing an inlet hopper having its lower discharge end communicating with the inlet of an expansible chamber, rotary gear type meat pump which is effective to pressurize the comminuted meat products fed into the hopper in order to deliver them to a plurality of discharge nozzles or stuffing horns of conventional construction. The pump is driven by a hydraulic motor through transmission gearing with the motor in turn being supplied with hydraulic fluid from a conventional high pressure pump. The described components are spread out along the upper surface of a base or pedestal so that the hopper is located relatively close to the floor level and, hence, may be loaded without requiring the lifting of the comminuted meat products to excessive heights. The pedestal is hollowed to form a tank or sump for the hydraulic fluid used in the operation of the system.

Each of the discharge nozzles has associated therewith a manually operated meat cock assembly or valve for controlling the flow of meat products from the pump to a sausage casing which is held over the end of the nozzle in the manner customarily used in the operation of sausage stuffing machines. In accordance with an important feature of the present invention, the meat cocks act upon a pilot valve which forms part of a hydraulic system for controlling the speed of the hydraulic motor driving the meat pump. The hydraulic system is so constructed and arranged that when all of the meat cock assemblies are closed the meat pump is ineffective to deliver meat products from the hopper to the discharge nozzles. When one of the meat cock assemblies is opened, the system arrangement is such that the hydraulic motor is driven at less than its maximum speed thus delivering from the meat pump the proper amount of meat product for filling the casing associated with the open meat cock assembly. When more than one of the meat cock assemblies are opened, the speed of the hydraulic motor is correspondingly increased to deliver a greater amount of meat products from the meat pump to the discharge outlets and, as a consequence, the amount of meat product delivered by the meat pump at all times corresponds with the number of open meat cock assemblies.

The invention, both as to its organization and manner of operation, together with further objects and advantages thereof, will best be understood by reference to the following detailed description taken in conjunction with the accompanying drawings wherein:

FIG. 1 is a front elevational view illustrating a continuous stuffing machine characterized by the features of the present invention with a portion of the base or pedestal of the machine being broken away to facilitate the illustration;

FIG. 2 is a top plan view of the apparatus illustrated in FIG. 1 with a portion of the inlet hopper or receiving chamber being broken away to show certain of the parts more clearly;

FIG. 3 is a fragmentary end view looking in the direction of the arrows 3—3 in FIG. 1;

FIG. 4 is an enlarged, fragmentary view showing the throat or exit end of the inlet hopper and its associated access door which may be opened to permit cleaning of the interior and the components located therein;

FIG. 5 is a fragmentary end view looking in the direction of the arrows 5—5 in FIG. 4 and illustrating particularly the exit end of the hopper;

FIG. 6 is a view similar to FIG. 4 but shows the access door in the open position;

FIG. 7 is an enlarged, fragmentary, sectional view taken along a line substantially corresponding to the line 7—7 in FIG. 2 and illustrating particularly the hydraulic motor and the transmission gearing through which this motor is connected to drive the meat pump;

FIG. 8 is a sectional view taken along a line substantially corresponding to the line 8—8 in FIG. 2 and shows particularly the meat pump and the transmission gearing connected thereto;

FIG. 9 is a sectional view taken along a line substantially corresponding to the line 9—9 in FIG. 8 assuming, of course, that the latter shows the entire pump construction;

FIG. 10 is a diagrammatic view illustrating the operation of the hydraulic control system including the pilot valve and its associated manually operated meat cock assemblies with both such assemblies being shown in closed position;

FIG. 11 is a fragmentary, diagrammatic view illustrating the pilot valve in condition for operation with one of the manually operated meat cock assemblies opened;

FIG. 12 is a view similar to FIG. 11 but shows the pilot valve in condition when both of the manually operated meat cock assemblies are open; and FIG. 13 is a schematic diagram illustrating the operation of the hydraulic system for controlling the speed of operation of the hydraulic motor driving the meat pump.

Referring now to the drawings and first to FIGS. 1 and 2, the continuous stuffing apparatus of the present invention is there indicated generally by the reference numeral 20 and comprises an inlet hopper or receiving chamber 21 which is funnel-shaped to taper downwardly and inwardly from its upper or mouth end 22 to a lower discharge end piece 23. The discharge or exit piece 23 for the hopper is formed as a separate piece and may be suitably joined to the body of the hopper as, for example, by welding. Both pieces of the hopper are formed of a suitable metal which is highly polished so that it is relatively easy to clean and the upper piece has its upper or mouth end 22 rolled over to facilitate the loading or pouring of material such as comminuted meat and meat products into the hopper. The lower discharge piece 23 is connected to the inlet of a meat pump 24 which is described more fully hereinafter and which functions to deliver comminuted meat products from the hopper 21 through a pair of conduits 25 and 26 respectively connected to discharge nozzles or stuffing horns 27 and 28. While only two discharge nozzles are shown, it will be recognized after the detailed description below that the principles of the present invention could be advantageously employed to construct a machine having more than two outlets.

A hydraulic motor 29 is connected through a transmission gearing indicated generally by the reference numeral 30 to drive the meat pump 24. Fluid for the hydraulic motor 29 is supplied from a conventional constant delivery vane type hydraulic pump 31a through a hydraulic control system which is described in detail below. The pump is driven by an electric motor 31b which cooperates therewith to form a motor driven pump unit identified generally by the reference numeral 31. The motor and its associated pump may be of any suitable construction but in one form of the invention which has been found to provide satisfactory results a three phase, squirrel cage wound, ten horsepower, 220/440 volt, 60 cycle motor of the fan cooled type was employed to drive a pump manufactured by Vickers, Inc. under their No. V–135X–20. The hydraulic system for controlling the speed of the motor 29 includes a plurality of valves mounted upon a valve block 32. All of the components described above are mounted upon a common support base or pedestal 33 which is illustrated as being of rectangular shape and comprises a bottom hollow tub portion 34 and a cover plate 35 secured to the bottom in the manner shown in FIG. 1. The tub portion 34 preferably takes the form of a metal casting with relatively thick walls while the cover is formed of a metal plate or sheet having downwardly depending side and end flanges joined together to form an integral lid. The tub portion 34 provides a chamber or reservoir 36 containing hydraulic fluid such as oil for use in the hydraulic system of the stuffing apparatus. The tub portion 34 is supported upon suitable legs carried by a plurality of horizontally spaced apart brackets 37 welded along the bottom of the tub. The tub support legs preferably take the form of feet 38 provided at the opposed ends of each bracket and these feet are adjustable for the purpose of controlling the height and/or the level of the pedestal 33. A removable cap 39 may be provided in the cover plate 35 for the purpose of uncovering an opening through which the chamber 36 may be filled with hydraulic fluid. A suitable drain may be provided in the bottom or tub portion 34 of the pedestal for removing the hydraulic fluid although the latter drain is not illustrated in the drawings.

The top of the cover plate 35 provides a generally horizontal supporting surface for the component elements of the stuffing machine. Thus, the hopper 21 is supported upon the plate 35 by means of three spaced apart vertical columns 41, 42 and 43 (FIG. 2) each of which is secured at its lower end within a support collar 44 fixedly secured to the plate 35 and at its upper end is inserted into a mounting bracket 45 attached to the exterior wall of the hopper 21. Thus, the three vertical columns support the hopper in a slightly elevated position near one end of the pedestal or base 33. The valve block 32 is secured to the cover plate 35 in the area beneath the hopper 21 and adjacent the left end of the pedestal as viewed in FIGS. 1 and 2.

The gearing 30 is contained within a gear case or housing 47 secured in fixed position upon the cover plate 35 in a position below the throat 23 of the hopper and just to the right of this throat as viewed in FIGS. 1 and 2. The gear case 47 is of generally rectangular shape and seated on its upper surface is the meat pump 24. Suitably secured to the left side of the gear case 47 as viewed in FIGS. 1 and 2 and extending outwardly from the case and beneath the hopper 21 is the hydraulic motor 29 which may be of any conventional construction but in one form of the invention satisfactory operation was obtained using a hydraulic motor manufactured by Vickers, Inc. and identified by their No. M2–330–60–11C–13–S2.

Returning now to the construction of the discharge piece 23 of the hopper 21, it will be observed that this piece includes an upper neck portion 23a leading to a lower throat portion 23b which is curved to provide an exit terminating in an outlet opening 50a for passing the meat products to the meat pump 24. As is best shown in FIGS. 4, 5, and 6, the neck portion 23a has two of its sides converging downwardly to form a funnel-like exit at the bottom of the hopper although the front and rear walls of this neck portion extend generally parallel to each other. The extreme outer end of the throat portion 23b is provided with a flange 50 to facilitate bolting of the discharge piece 23 to the housing for the meat pump 24 as is described more fully below.

To provide access to the interior of the discharge piece 23 for the purpose of cleaning the throat portion 23b at the completion of a run or for sanitary purposes, one side of the discharge piece is provided with an access opening 51 which is best shown in FIG. 5 of the drawings. The opening 51 is actually circular in shape although due to the curvature of the back of the throat portion 23b this opening has the appearance of an ellipse as viewed in FIG. 5. A raised boss 52 formed integral with the discharge piece 23 surrounds the opening 51 in order to form a seat for an access door indicated generally by the reference numeral 53 which door is adapted to be released from the closed position shown in FIG. 4 and swung outwardly to the position shown in FIG. 6 whenever access through the opening 51 is desired. The latter access door 53 includes a circular cover 54 having a cylinder portion dimensioned to fit closely within the opening 51. The cylinder portion is provided with an annular groove 55 in its periphery for receiving an O-ring 56 which, with the access door in closed position, seats against the inner wall of the boss 52 in order to prevent the escape of meat products and to prevent entry of air into the hopper. An annular flange 57 extending radially outward from the cylinder portion seats against the flat outer face 52a of the boss 52 when the access door 53 is closed, thus limiting the depth of insertion of the cylinder portion and insuring that the smooth, polished inner end face 54b of the cylinder will lie flush with the walls of the discharge piece 23. The inner face 54b is curved or contoured to form a continuation of the interior surface of the discharge piece 23, thus avoiding the formation of crevices where particles are likely to accumulate.

The cover 54 is adjustably mounted upon a relatively thick door carrying portion 59 of an elongated pivot arm 58 which is provided at its upper end with pivot lugs 60 cooperating with a pin 61 and with a fixed lug 62 welded to the exterior of the discharge piece 23 to form a pivot mounting for the door 53. The adjustable mounting of the cover 54 upon the support portion 59 permits accurate alignment of the cover with the opening 51. While the adjustable mounting may take a number of different forms, in the arrangement illustrated, the cover includes an integral collar 63 extending axially outward from the flange 57 and seating against the side face of the cover support portion 59, this collar being provided with a tapped central opening 63a for receiving a mounting bolt 64. The latter bolt extends loosely through an elongated slot 59a in the cover supporting portion 59 thus providing a float mounting to permit the cover to be aligned with respect to the opening 51, the amount of cover movement being limited by engagement of the bolt 64 with the end walls of the elongated slot 59a. In order to insure that the curved face 54b is properly oriented to conform to the curvature of the inner face of the discharge piece 23, it is important that the cover 54 be properly aligned and that it be prevented from turning about its axis, a function which is performed by an aligning pin 65 inserted through a second opening 59b in the support portion 59 and threaded into a tapped opening 54a in the cover. In order to lock the access door in closed position, there is provided a hand operated knob 66 having a threaded shank portion 66a for reception within a tapped bore 52b formed in the boss 52. The knob 66 is mounted for rotation upon the cover supporting portion 59 of the pivot arm 57 and to this end extends loosely through an aperture 59c. A collar 67 carried by the shank 66a on one side of the portion 59 cooperates with a cylindrical hub 68 on the knob to limit axial movement of the knob. Obviously, the cover is locked in closed position by turning the knob to thread the shank portion 66a into the tapped bore 52b until the flange 57 seats against face 52a of the boss 52 and, at the same time, the O-ring 56 forms a tight seal against the wall defining the opening 51. To permit the opening 51 to be uncovered, the hand operated knob 66 may be turned in proper direction to thread the shank 66a out of the tapped opening 52b until the door 53 is released whereupon it may be opened by pivoting it about the pin 61 in a clockwise direction from the position shown in FIG. 4 to that shown in FIG. 6.

Turning next to the construction of the meat pump 24 and referring particularly to FIGS. 1, 2, 8 and 9 of the drawings, it should be noted that this pump is of the constant pressure, positive displacement type employing a pair of interengaging impellers 70 and 71 preferably formed of resilient material such as relatively hard rubber. These impellers rotate in the directions indicated by the arrow pointed arcuate lines and are disposed within a pump chamber 72 defined within a pump housing or casing 73 which is, in turn, mounted upon the housing 47 for the transmission gearing. The pump casing 73 includes a flange portion 74 at one side having a smooth, polished outer face 74a for seating snugly against the smooth outer face of the flange 50 and a suitable gasket or ring (not shown) may be interposed between these faces to prevent the escape of comminuted meat products. The flange 74 and the side of the casing 73 adjacent thereto are provided with a through opening 75 in alignment with the hopper exit opening 50a and leading to the pump chamber 72 for the purpose of delivering meat products to the suction side of the impellers 70 and 71. The side of the pump housing 73 opposite to the flange 74 is provided with a raised area 77 having a smooth, polished outer face 77a seating against a discharge yoke 78 connected to the discharge conduits 25 and 26. An outlet opening 79 extends through the raised area 77 and communicates with the pump chamber 72 to receive pressurized meat products at the outlet side of the impellers 70 and 71. The pump housing 73 is formed in two parts, namely, a lower body 81 and a top cover 82 mounted for pivotal movement upon the discharge yoke so that the cover may be opened to gain access to the pumping chamber 72 for the purpose of removing the impellers 70 and 71 in order to clean these components and the interior of the pumping chamber. The body 81 is an integral piece having a side wall defining the pump chamber 72 which comprises two arcuately-shaped chamber portions 72a and 72b interconnected by a third portion 72c. The two arcuate portions 72a and 72b are respectively dimensioned to receive the impellers 70 and 71. The body 81 further comprises a bottom wall 83 having openings 84 and 85 therein for respectively accommodating a pair of shafts 86 and 87 having upper impeller engaging portions 86a and 87a of square-shaped cross section extending into the chamber portions 72a and 72b where they receive the impellers 70 and 71.

The cover 82 comprises a flat plate 88 having its under surface ground and polished to fit snugly against a polished upper ridge 81a on the side wall of the pump body 81. The under surface of the plate 88 is provided with a groove 89 for receiving an O-ring 90 cooperating with the latter ridge to provide a seal. Secured to the top of the plate 88 is a bar 91 having its opposed ends extending beyond the plate 88 and these ends are provided with openings 92 and 93 for accommodating hand knobs 94 and 95, respectively, by means of which the cover plate 88 is clamped against the pump body 81. As is best shown in FIG. 2, the bar 91 is provided with a pair of spaced apart, laterally depending arms 96 and 97 each of which has its extreme outer end pivotally mounted upon a pivot pin 100 (FIG. 1) carried by a lug 98 extending upwardly from the discharge yoke 82. Thus, the entire cover 82 is mounted for pivotal movement about the pivot pins 100 from the closed position shown in solid lines in FIG. 1 to open position shown in broken lines where the pump chamber 72 and the component elements mounted therein are exposed. The hand knobs 94 and 95 are identical in construction and they cooperate with vertical posts 101 and 102, respectively, to lock the cover in the closed position. More specifically, each of these hand knobs comprises an upper handle portion lying above the bar 91 and a shank portion extending through the associated opening 92 or 93 in the bar and protruding slightly beyond the under surface of the latter bar. The shank portion of each hand knob is provided with an internally threaded axial bore 99 extending partially therethrough for receiving the externally threaded upper end of the associated clamping post 101 or 102. Obviously, as the hand knobs 94 and 95 are turned onto the clamping posts, the cover 82 is drawn tightly against the pump body to compress the O-ring 90 in order to form a seal. When it is desired to raise the cover 82 for cleaning purposes, the hand knobs 94 and 95 are threaded off the posts 101 and 102 until annular collars 104 carried by the stem portion of each knob enter annular recesses 105 formed in the lower face of the bar 91 and surrounding the two openings 92 and 93. Each of the collars 104 is retained on the stem portion of its hand crank by means of a resilient locking ring 106 seated within a peripheral groove in the stem. Since the hand crank is free to turn within its associated opening 92 or 93, the threading of the hand knob off of its associated post is effective to move the knob vertically upward as viewed in FIG. 8 with the upward movement being limited by engagement of the collar 104 with a shoulder 105a formed by the recess 105. When the collar 104 engages the shoulder 105a, the hand crank is fully disengaged from its associated post and when both hand knobs have been so released the cover 82 may be pivoted about the pins 100 to the broken line position shown in FIG. 1.

Considering next the transmission gearing 30 for connecting the hydraulic motor 29 to the meat pump 24 and referring particularly to FIGS. 7 and 8 of the drawings, it will be observed that this gearing comprises a horizontal shaft 110 having a curved worm 111 formed intermediate its ends. The latter worm meshes with a worm gear 112 mounted upon the shaft 86 to provide a relatively large reduction between the rate of rotation of the shaft 110 and that of the shaft 86. The curvature of the worm 111, of course, corresponds to that of the worm gear 112 so that a relatively large number of teeth on these two gears are in simultaneous engagement thus distributing the load over several teeth rather than concentrating it at a single tooth as would be the case if a straight worm were employed. As is shown in FIG. 8, the periphery 112a of the worm gear 112 is also curved to correspond to the curvature of the teeth of the worm 111, thus providing a relatively wide area of contact to further distribute the load.

For the purpose of maintaining the relative angular positions of the shafts 86 and 87 without reliance upon the engagement of the impellers 70 and 71 to perform this function, the shafts 86 and 87 respectively carry interengaging circular gears 150 and 151. The gears 150 and 151 are provided with a relatively large number of teeth when compared with the number of teeth of the impellers 70 and 71 so that the gears 150 and 151 maintain the relative positions of the shafts 86 and 87 and permit a very small area of engagement between the two impellers 70 and 71. More specifically, the teeth of the latter impellers and the interdental spaces between these teeth are curved or rounded so that the two impellers engage only along the relatively small area at the extreme outer end of the tooth. A large area of engagement between the two impellers would result in the entrapment of meat products therebetween and would cause squeezing of these products to produce an action which is known as "greasing" since this squeezing results in reduction of any fat contents of the meat products to grease. The shaft 110, the worm gear 112, the gears 150 and 151 and the circular lower ends of the shafts 86 and 87 are disposed within a chamber 113 formed within the gear housing 47. The latter housing comprises a body which is illustrated as being rectangular in cross section and which includes side walls 114 and an inwardly extending bottom wall 115 partially closing the lower end of the housing but having a circular opening 116 therein surrounded by an enlarged support ring 109 formed integral with the bottom wall. The opening 116 accommodates a bottom closure plate 117 suitably secured to the bottom wall as, for example, by means of machine screws extending through an annular flange thereon and into engagement with tapped bores formed in the ring 109. The housing 47 further comprises an upper cover plate 118 attached to the side walls 114 and having threaded openings 119 and 120 therein for respectively accommodating the lower ends of the clamping posts 101 and 102. The lower end of each of these posts protrudes beyond the bottom surface of the plate 118 to receive a lock nut 121 which functions to prevent turning of the posts with respect to the plate 118 when the hand knobs 94 and 95 are turned. The plate 118 is further provided with an integral support ring 123 extending around an enlarged circular opening 122. A recess 123a extends around the opening 122 and into the upper face of the cover plate 118 for the purpose of accommodating an annular lip 142a on a seal support plate 142. The latter plate is provided with a pair of spaced openings 142b and 142c for respectively accommodating the shafts 86 and 87. The shaft 86 is journaled for rotation by a pair of bearing assemblies 124 and 125 mounted within the gear housing 47 while the shaft 87 is journaled for rotation by a similar pair of bearing assemblies 126 and 127. Removable cover plates 128 (FIG. 8) and 129 (FIG. 9) are provided in the side wall 114 of the housing to permit access to the gear chamber 113 and the component elements housed therein. The left side wall as viewed in FIG. 7 is also provided with an opening 130 through which extends one end of the shaft 110 for connection via a coupling sleeve 136 to an output shaft 135 of the hydraulic motor 29. The shaft 110 is journaled for rotation within the housing 47 by means of thrust bearings 131 and 132 of conventional construction. The opening 130 also receives one end of a sleeve 133 having an annular flange 134 secured to the side wall of the housing 47. The latter sleeve supports the hydraulic motor 29 and also provides a housing for the coupling sleeve 136 and for the ends of the shafts 110 and 135 to which the latter sleeve is splined.

Since the chamber 113 is filled with lubricating oil, it is, of course, essential to seal the chamber 113 from the pump chamber 72 in the regions surrounding the shafts 86 and 87 in order to avoid contamination of the meat products being pumped by the meat pump 24. To this end, a seal ring 140 is provided for the shaft 86 and a similar ring 141 is provided for the shaft 87. The seal rings 140 and 141 are respectively seated within annular recesses 138 and 139 formed in the end plate 142 around the shaft openings 142b and 142c, respectively. The two seal rings 140 and 141 are identical and each includes an inwardly extending annular tongue 143 seating against the associated shaft to form a seal against the upward flow of lubricant. As is shown in FIGS. 1 and 2, a gauge 137 is provided for indicating the level of the lubricating fluid in the chamber 113.

It is also important to seal the bottom wall 83 of the pump housing 73 in the regions surrounding the shafts 86 and 87 in order to prevent the escape of meat products into the transmission gear chamber 113, thus avoiding the possibility of accumulation of contaminating particles on the moving parts contained within the pump chamber. To effect the latter seal, sealing means 144 and 145 respectively surround the shafts 86 and 87 in the vicinity of the openings 84 and 85. These two sealing means 144 and 145 are identical and, hence, only one will be described in detail. Thus, the sealing means 144 comprises an annular metal ring 146 having an axially extending rim 147 thereon overlying a recessed portion of the shaft 86. An O-ring 148 is disposed between the ring 146 and the shaft 86 to prevent the escape of meat products along the interior of the ring. A sealing ring 149 seated within an annular recess 84a extending around the opening 84 has its inner face bearing against the rim 147 of the metal ring 146. The ring 149 is sealed against the bottom wall 83 of the pump housing to prevent the escape of meat products and, to this end, it is provided with a downwardly facing annular groove for receiving a small annular lip 84b formed adjacent the recess 84a, thus providing a relatively large seal area between the ring 149 and the bottom wall of the pump housing and also providing a tortuous path which inhibits the flow of meat products therealong.

Considering next the discharge yoke 78 and referring again to FIG. 1 of the drawings, it will be observed that this yoke includes a throat portion 78a terminating in a flange 159 having a polished flat surface thereon seating snugly against the flat exterior face 77a of the pump housing. The flange 159 is, of course, provided with a through opening extending from the hollow of the throat portion 78a and communicating with the outlet opening 79 so that meat products from the meat pump 24 flow into the throat portion 78a and are then delivered through a pair of upwardly bent elbow portions 160 and 161 respectively leading to the conduits 25 and 26. As is best shown in FIG. 2, the latter conduits extend upwardly from the yoke 78 and diverge upwardly toward their upper ends which are bent to form horizontally extending discharge portions 25a and 26a. These two horizontally extending portions are supported upon a horizontally extending channel-shaped bracket 162 which is supported in elevated position above the motor driven pump unit 31 by means of a pair of vertical columns 163 and 164 having their lower ends secured to the base plate 35. The two columns 163 and 164 straddle the driven pump unit 31 and are of sufficient length to support the discharge conduits 25 and 26 at a level slightly above the work area on top of a suitable table or bench 165 one end of which is shown in FIG. 1. The bracket 162 also supports a pair of manually operated meat cock assemblies 166 and 167 for respectively controlling the flow of meat products from the conduits 25 and 26 to the stuffer horns 27 and 28. The meat cock assemblies are of conventional construction and need not be described in detail. They are preferably of the rotary plug type wherein the plug is turned by means of a hand operated handle 168, although it should be understood that the term "manually operated meat cock assembly" is not intended to limit the structure to one in which the valves are turned by hand since these valves could also be manipulated by suitable foot pedals as is the case in some prior art constructions. Moreover, the term "manually operated valve" may include power operated valves in which the operation is initiated and terminated manually. The flow could also be controlled by power operated valves in which the operation is controlled automatically by timing devices without manual supervision. Each meat cock assembly also includes a cam positioned below the meat cock housing and turned with the rotary valve plug as the handle 168 is manipulated. The cam for the meat cock assembly 166 is designated in FIG. 3 by the reference numeral 170 while that for the meat cock assembly 167 is designated by the reference numeral 171. These cams act upon a pilot valve 172 for the purpose of controlling the speed of operation of the hydraulic motor 29 in a manner described more fully below. The pilot valve 172 is mounted upon the under side of a horizontal support platform 173 extending laterally from the support bracket 162 as is shown in FIGS. 2 and 3.

The meat cock assemblies 166 and 167 are adapted to be detachably secured to the ends of the discharge conduits 25 and 26 and, to this end, each of the horizontal portions 25a and 26a of the discharge conduits terminates in an outwardly extending O-ring flange 175 which is adapted to seat against a somewhat similar flange formed on the housing of the associated meat cock assembly. An O-ring is interposed between these mating flanges although this is not illustrated in the drawings. In order to draw the two mating flanges into tight sealing engagement and to provide a quickly detachably connnection therebetween, there is provided a toggle type clamping ring which is preferably of the type described in detail in U.S. Patent No. 2,862,275. This clamping ring permits the meat cock assembly to be quickly detached from the end of the associated discharge conduit for the purposes of cleaning and also eliminates the use of threads or other crevices where food particles may collect.

Each of the meat cock assembly housings is connected at its discharge side with a stuffing horn. In order to permit the stuffing of different types of sausages, it is desirable to be able to use stuffing horns of somewhat different size and, hence, to facilitate a rapid interchange of these horns the connection between the horn and the meat cack assembly should be quickly detachable. All of the stuffing horns used are of the same general construction since each includes a cup portion 177 having an annular flange thereon which is adapted to be clamped to a similar flange at the outlet side of the meat cock housing by means of a quickly detachable clamping assembly 178 identical in construction to the clamp 176 described above. Each stuffing horn further includes a horizontally extending tubing or nozzle 179 which is soldered or otherwise secured to the cup portion 177 and which is rounded at its outer end to avoid the use of sharp corners which may tear the casing. The stuffing horns for different products will vary with respect to the outer and inner diameters of the nozzle or tubing.

The two meat cock assemblies 166 and 167 are adapted to be manipulated by operators standing on opposite sides of the bench or table 165. These operators, as is well known in the art, are supplied with sausage casings in the form of very thin, corrugated tubular members which are slipped over the nozzle 179 and are held in position while the meat cock assembly is manually opened to permit the flow of meat products under the constant pressure of the pump 24 through the conduit, through the open meat cock assembly and through the stuffer horn into the sausage casing. The meat must be maintained under relatively constant predetermined pressure insufficient to rupture the casing but high enough to give a desired rate of production. The requirements are satisfied, in accordance with an important feature of the present invention, by controlling the speed of operation of the meat pump 24 so that the volume of meat products delivered at the outlet side of the meat pump corresponds to the demands of the operators. Thus, if both of the meat cock assemblies 166 and 167 are open, the meat pump 24 is driven at proper speed to deliver enough material for both meat cock assemblies while if one of the meat cock assemblies is closed and the other meat cock assembly is open, the speed of operation of the pump is reduced to approximately one half the former speed thus reducing the rate of flow of meat products to one half of that resulting when both meat cock assemblies are open. When both of the meat cock assemblies are closed, the impellers 70 and 71 of the meat pump 24 are not driven. The described operation is accomplished automatically by means of a hydraulic system including the pilot operated valve 172 referred to above. This hydraulic system includes, in addition to the pilot valve 172, a plurality of valves 180, 181, 182, and 183 mounted upon the valve block 32 and interconnected in a hydraulic circuit in the manner illustrated diagrammatically in FIGS. 10 and 13. All four of the valves 180, 181, 182 and 183 are commercially available items which may be purchased from Vickers, Inc. and, hence, they are neither shown in detail nor described at length. More specifically, the valve 180 is an adjustable, high speed flow control valve sold under Vickers number FG-06-20-10, the valve 181 is a pressure relief valve sold under Vickers number CG-10-BV-10, the valve 182 is a four way high-low speed switch valve sold under Vickers number DG-3S4-062A-20, and the valve 183 is an adjustable low speed flow control valve sold under Vickers number FG-03-11-10.

When the electric motor 31b is energized to drive the hydraulic pump 31a, fluid is drawn from the sump or reservoir 36 through a pump inlet pipe 185 (FIG. 2) to the inlet side of the pump 31a where this fluid is pressurized and discharged through a pump outlet pipe 186. The inlet fluid to the pump 31a passes through a filter 187 (FIG. 10) of conventional construction located within the reservoir 36. Access to the latter reservoir for the purpose of cleaning or replacing the filter 187 may be had through a filter access cover 188 (FIG. 2) detachably secured to the base plate 35. The discharge pipe 186 from the pump is connected to a suitable fitting 188 on the plate 35 and this fitting is in turn connected to one end of a pipe 189 which extends through the reservoir 36, through a check valve 240 and is then connected to another fitting 190 on the valve block 32. Three additional connections are made from the pilot valve 172 to the valve block 32, one such connection extending from the pilot valve through a small tubing 192 leading downwardly from the pilot valve to a suitable fitting (not shown) attached to the base plate 35. The latter fitting, in turn, communicates with a tubing 193 extending through the reservoir 36 and connected to the pressure relief valve 181 of the valve block. A second tubing 194 (FIG. 10) leading from the pilot valve is connected to a fitting on the base plate and communicates with another tubing 195 extending through the reservoir from the valve block to the tube 189 on the pump side of the check valve 240. The third connection from the pilot valve is effected through a tubing 196 connected to a fitting mounted on the base plate 35 and communicating with another tubing 197 extending through the reservoir 36 to connect to the four way valve 182. A fourth tubing 198 extends downwardly from the pilot valve 172 and through a fitting on the base plate to connect to a tank pipe which is in open communication with the reservoir 36 in order to provide a tank connection or discharge for the pilot valve.

Turning now to the construction of the pilot valve, it will be observed that this valve comprises a valve body 200 consisting of a metal block of rectangular cross section having a central longitudinal valve bore therein and having end plates detachably secured to its opposed ends. The exact construction of the pilot valve may vary to some extent and, hence, this valve is shown only schematically in FIGS. 10, 11 and 12. In any event, a pair of valve spools 202 and 203 slidably mounted within the bore 201 and have pusher rods 204 and 205 respectively extending through openings in the end plates of the valve block. The rounded outer ends of the pusher rods 204 and 205 are held in peripheral engagement with their associated cams 170 and 171, respectively, by means of a coil spring 206 positioned near the center of the valve bore 201 and interposed between the two valve spools 202 and 203. The cams 170 and 171 are eccentric and when the meat cock assemblies 166 and 167 are both closed as shown in FIG. 10, the pusher rods 204 and 205 engage the smaller diameter portions of both cams so that the coil spring 206 is effective to force both of the valve spools 202 and 203 to their extreme outer positions. When the meat cock assembly 167 is opened or moved to the position shown in FIG. 11 the pusher rod 205 engages the larger diameter portion of the cam 171 and, as a consequence, the valve spool 203 is moved inwardly to compress the coil spring 206. Since, in the condition shown in FIG. 11, the meat cock assembly 166 remains closed, the valve spool 202 remains at its extreme outer position and, hence, the latter valve spool does not move when the assembly 167 is opened. Obviously, opening of the assembly 166 with the assembly 167 closed would result in inward movement of the spool 202 while the spool 203 would remain in its outer position. When both of the meat cock assemblies are opened as shown in FIG. 12, both of the plunger rods 204 and 205 engage the larger diameter portions of the cams 170 and 171, respectively, with the result that both valve spools 202 and 203 are moved inwardly to compress the spring 206.

In the form shown in FIGS. 10 to 13, inclusive, the valve bore 201 includes a number of spaced apart annular grooves which bear the reference numerals 210 to 219, inclusive, reading from top to bottom as viewed in FIG. 10. The valve body 200 is also provided with a number of drilled passages therein represented by the broken lines shown in FIG. 10. Thus, a passage 220 in the valve block 200 connects the annular groove 219 to a fitting which is, in turn, connected to the tubing 192 previously described and, for convenience, this connection will be referred to hereinafter as a vent connection since its purpose is to vent the pressure relief valve 181 in order to keep the pressure of the hydraulic fluid delivered to the motor 29 at a very low value when both of the meat cock assemblies 166 and 167 are closed. A second passage 221 connects the annular groove 217 to a fitting which is, in turn, connected to the tubing 194 and this connection will hereinafter be referred to as the pump connection since it is effective to deliver hydraulic fluid from the pump 31a to the valve bore of the pilot valve 172. Passage means represented by the broken line 222 are provided for connecting the annular grooves 215 and 211 together and to a fitting leading to the tank connection tubing 198. The annular groove 213 is connected through a passage represented by the broken line 223 to a fitting leading to the tubing 196 thus connecting the valve bore of the pilot valve to the four way valve 182 for a purpose which will become apparent as the description proceeds. The annular grooves 210 and 218 are connected together through a passage represented by the broken line 224 and, finally, the annular grooves 212 and 216 are connected together through passage means represented by the broken line 225.

To provide the desired interconnections between the annular grooves 210 to 219, inclusive, the valve spools 202 and 203 are provided with a plurality of spaced apart lands which are dimensioned to fit closely in fluid tight engagement with the valve bore 201 in the regions not occupied by the annular grooves. These lands are separated by annular recesses or grooves in the peripheries of the spools. More specifically, the spool 202 is formed with four spaced lands 226, 227, 228 and 229 with the lands 226 and 227 being separated by an annular recess 230, the lands 227 and 228 being separated by an annular recess 231, and the lands 228 and 229 being separated by an annular recess 232. In similar manner, the valve spool 203 is formed with four spaced apart lands 233, 234, 235 and 236 which are separated by the annular recesses 237, 238 and 239.

When both of the meat cock assemblies 166 and 167 are open as shown in FIG. 10, the vent connection including the tubing 192 is connected through the passage 220, through the annular grooves 218 and 219 (which are, at this time, interconnected by the recess 239 in the valve spool 203), through the passage means 224, and through the annular grooves 210 and 211 (which are interconnected by the recess 230 in the valve spool 202) to the passage means 222 leading to the tank pipe 198. Thus, a direct vent connection is provided from a vent port on the pressure relief valve 181 to the tank or reservoir 36. When the pressure relief valve 181 is thus vented, it is effective to maintain the pressure of the fluid from the pump 31a at or below a predetermined low value, for example, a value in the vicinity of 50 lbs. per square inch. The pressure relief valve bypasses the excess fluid directly to the tank 36 and, hence, prevents the buildup of pressure above 50 p.s.i., a value which is insufficient to drive the hydraulic motor 29. Thus, with both meat cock assemblies closed, the motor 29 is ineffective to drive the meat pump 24. The check valve 240 establishes a differential pressure between the lines on opposite sides of the check valve which differential pressure is applied through a tubing 242 to the hydraulic motor 29 where it acts upon the vanes of this motor to hold them in contact with a cam (not shown) in the motor housing, thus reducing leakage around the vanes.

When one of the meat cock assemblies is opened, for example, the assembly 167 as shown in FIG. 11, the vent connection 192 is no longer connected directly to the tank tubing 198 in view of the fact that the land 236 becomes effective to break the connection between the annular grooves 218 and 219. Obviously, if the meat cock assembly 166 is opened while the assembly 167 remains closed, the land 226 becomes effective to break the vent connection for the pressure relief valve 181. In either case, when the vent connection from the pressure relief valve 181 is broken, the latter valve no longer bypasses fluid at low pressure and, as a consequence, the pressure of the fluid at the outlet of the pump 31a builds up until it becomes sufficient to drive the hydraulic motor 29. The speed of drive of the motor 29 is, at this time, controlled by the two flow control valves 180 and 183 both of which are effective to bypass some of the fluid from the motor 29. As will be apparent from FIG. 13, the valve 180 provides a continuously open bypass path for the fluid but the flow path to the valve 183 includes the four way valve 182. When high pressure fluid is not being supplied from the pump 31a to the four way valve 182 through the connection 196, 197, a condition which will exist both when the two meat cock assemblies are closed and also when only one of these assemblies is open, the four way valve is in the position shown in FIG. 13 and and provides a connection from the line 241 to the valve 183. Thus, fluid is being bypassed to the reservoir 36 through both of the valves 180 and 183. Each of the valves 180 and 183 may be adjusted to control the size of a bypass orifice therethrough. The amount of fluid bypassed by the two valves, of course, controls the amount of fluid remaining for delivery to the motor 29 and, as a consequence, the setting of the two valves 180 and 183 controls the speed of the motor 29. Since the pressure relief valve 181 is no longer vented with one of the meat cock assemblies open, it remains ineffective unless the pressure of the fluid exceeds the high pressure relief setting of this valve in which case the pressure relief valve functions in the usual manner to bypass any excess above the high pressure setting directly to the reservoir. The high pressure fluid delivered to the pilot control valve via the connecting lines 194, 195 serves no useful purpose under the low speed condition since it is delivered only to the annular grooves 212, 216 and 217 which are all blocked.

When both of the meat cock assemblies 166 and 167 are opened as shown in FIG. 12, the connection from the vent port of the pressure relief valve 181 to the tank tubing 198 remains broken due to the fact that the land 236 continues to block the connection between the annular grooves 218 and 219. However, when both valve spools are moved inwardly, a connection is provided from the pump line 194, 195 to the four way valve connection 196, 197. The latter connection extends from the passage 221, through the annular groove 217, through the recess 238, through the annular groove 216, through the passage means 225, through the annular groove 212, through the recess 231, through the annular groove 213 and through the passage means 223 to the tubing 196. Thus, high pressure fluid from the pump 31a is delivered to the four way valve 182 to move the valve spool (not shown) of this valve to a position where the fluid connection from the line 241 to the low speed flow control valve 183 is broken. Thus, one of the two bypass paths which are effective under the low speed conditions is now interrupted and, as a result, the fluid from the pump 31a is bypassed only through the high speed flow control valve 180 so that more fluid is now available to drive the motor 29 at higher speed. As was previously indicated, the valve 180 may be regulated to control the amount of fluid bypassed and, hence, it is set to establish the desired maximum speed of the hydraulic motor 29 to provide a a proper rate of meat flow when both of the assemblies 166 and 167 are open. The valve 183 is set to establish the desired speed of operation of the motor 29 to produce a proper rate of meat flow when only one of the assemblies 166 or 167 is open.

Considering now the operation of the stuffing machine described above, it will be apparent that the apparatus is placed in operation by starting the electric motor 31b which is, in turn, effective to drive the hydraulic pump 31a. Comminuted meat products are then loaded into the inlet hopper or receiving chamber 21 and the stuffing operation is now ready to begin. The two operators, standing on opposite sides of the table 165, are able to manipulate the meat cock assemblies 166 and 167 entirely independently of each other since the operation of one assembly is not dependent upon the conditions existing at the other. The operation of the two assemblies will be effective in a manner which is believed to be obvious in view of the foregoing detailed description to control the speed of drive of the hydraulic motor 29, thus driving the meat pump 24 at a rate corresponding to the amount of meat products required. Thus, with both of the meat cock assemblies 166 and 167 open, the maximum amount of meat products is delivered from the pump 24, while the speed of operation is reduced when only one of the meat cock assemblies is open. Obviously, the pump is not driven when the two meat cock assemblies are both closed and, as a result, there is no buildup of pressure on the meat product contained within the discharge yoke 78 and the conduits 25 and 26. The machine described is thus capbale of stuffing a complete line of meat products without requiring elaborate adjustments.

While a particular embodiment of the invention has been illustrated and described, it will be recognized that many modifications will readily occur to those skilled in this art and it is, therefore, contemplated by the appended claims to cover any such modifications as fall within the true spirit and scope of the present invention.

What is claimed as new and desired to be secured by Letters Patent of the United States is:

1. In a continuous feeding apparatus for viscous materials such as meat and meat products, the combination which comprises means defining an inlet chamber containing the materials, pump means communicating with the chamber, a plurality of outlet means connected to receive material delivered by said pump means, each outlet means including valve means for opening and closing its outlet means to control the flow of material therefrom, and means controlled by all of said valve means for automatically controlling the operation of the pump means to deliver material at a predetermined flow rate from said chamber when all of said outlet means are open and to automatically reduce the flow rate of material delivered by said pump means to a value less than said predetermined flow rate when only a portion of the outlet means are opened.

2. In a continuous feeding apparatus for viscous materials such as meat and meat products, the combination which comprises pump means, first and second outlet means both connected to receive material delivered by said pump means, said first and second outlet means respectively including first and second valve means which may be opened and closed to control the flow of material, and means controlled by both of said valve means for automatically controlling the operation of the pump means to deliver material at a predetermined flow rate when both of said valve means are opened and to automatically reduce the flow rate of material delivered by said pump means to a value equal to approximately one half of said predetermined flow rate when only one of the valve means is opened.

3. In a continuous feeding apparatus for viscous materials, the combination which comprises pump means, a plurality of outlet means connected to receive material delivered by said pump means, each outlet means including valve means which may be opened and closed to control the flow of material therethrough, and means controlled by all of said valve means for automatically controlling the operation of the pump means to deliver material at a predetermined flow rate when all of said valve means are open, to automatically reduce the flow rate from said pump means to a value less than said predetermined flow rate when only a portion of the valve means are opened and to automatically render said pump means ineffective to deliver material when all of said valve means are closed.

4. In a continuous feeding apparatus for viscous materials, the combination which comprises a single constant pressure, rotary pump, means for driving said pump, a plurality of outlet means connected to receive material delivered by said pump, each outlet means including valve means which may be opened and closed to control the flow of material therethrough, and means controlled by all of asid valve means for automatically controlling the operation of the pump driving means to render said pump effective to deliver material at a predetermined flow rate when all of said valve means are open, to automatically reduce the flow rate of material deliivered by said pump to a value less than said predetermined flow rate when only a portion of the valve means are opened and to automatically render said pump ineffective to deliver material when all of said valve means are closed.

5. In a continuous feeding apparatus for viscous materials, the combination which comprises a single constant pressure, rotary pump, means for driving said pump, first and second outlet means both connected to receive material delivered by said pump, each outlet means including a manually operated valve which may be opened and closed to control the flow of material therethrough and means controlled by both of said valves for automatically controlling the operation of the pump driving means to render said pump effective to deliver material at a predetermined flow rate when both of said valves are open, to automatically reduce the flow rate of material delivered by said pump to a value equal to approximately one half said predetermined flow rate when only one of the valves is open, and to automatically render the driving means ineffective to drive the pump when both of the valves are closed.

6. In an apparatus for feeding food products into casings, the combination of an inlet hopper for receiving the food products and having a discharge outlet therein, a rotary pump having an inlet communicating with said discharge outlet and also having an outlet; first and second discharge means communicating with the pump outlet and each including a manualy operated valve which may be opened and closed to control the flow of food products therethrough; a pilot control valve actuated by the two manually operated valves; fluid operated motor means operably connected to drive said rotary pump; means including a fluid pump for supplying fluid to said motor means; and a hydraulic control system including said pilot control valve for controlling the flow of fluid from said fluid pump to said motor means, said hydraulic control system being constructed and arranged to deliver a predetermined volume of fluid to said motor means when both of said manually operated valves are open, to deliver a lesser volume of fluid to said motor means when only one of the manualy operated valves is open, and to render the motor means ineffective to drive the pump when both of the manually operated valves are closed.

7. In an apparatus for feeding food products into casings, the combination of an inlet hopper for receiving the food products and having a discharge outlet therein, a rotary pump having an inlet communicating with said discharge outlet and also having an outlet; first and second discharge means communicating with the pump outlet and each including a manually operated valve which may be opened and closed to control the flow of food products therethrough; a pilot control valve actuated by the two manually operated valves; fluid operated motor means operably connected to drive said rotary pump; means including a fluid pump for supplying fluid to said motor means; and a hydraulic control system including said pilot control valve for controlling the flow of fluid from said fluid pump to said motor means, said hydraulic control system including a pressure relief valve connected to said pilot control valve, first and second flow control valves and a switch valve, means connecting said first control valve to bypass a portion of the fluid delivered by said fluid pump in order to control the flow to said motor means, means connecting said second flow control valve through said switch valve to bypass fluid from said fluid pump, and means connecting said pilot control valve to said switch valve and to said fluid pump, said pilot control valve being constructed and arranged to render said pressure relief valve effective to limit the pressure of fluid delivered to said motor means to a predetermined low value insufficient to drive the motor means when both of said manually operated valves are closed, said pilot control valve being further constructed are arranged to render said pressure relief valve ineffective to limit the pressure of the fluid delivered to said motor means to said predetermined low value when one of said manually operated valves is open whereupon the pressure of the latter fluid becomes sufficient to drive said motor means in order to cause the rotary pump to pass food products from the hopper through the open manually operated valve, the speed of drive of said motor means with only one manually operated valve open being controlled by the amount of fluid bypassed by both of said flow control valves, said pilot control valve being further constructed and arranged to supply fluid from said fluid pump to said switch valve when both of said manually operated valves are opened, thereby rendering said switch valve effective to interrupt the bypass path through the second flow control valve to decrease the amount of fluid bypassed from the motor means so that the motor means is driven at greater speed in order to deliver food products from the rotary pump through both of the open manually operated valves.

8. In an apparatus for feeding food products into casings, the combination of an inlet hopper for receiving the food products and having a discharge outlet therein, a rotary pump having an inlet communicating with said discharge outlet and also having an outlet; first and second discharge means communicating with the pump outlet and each including a manually operated valve which may be opened and closed to control the flow of food products therethrough; a cam operably connected to each of said valves; a pilot control valve having a pair of valve elements therein respectively actuated by the two cams; fluid operated motor means operably connected to drive said rotary pump; means including a fluid pump for supplying fluid to said motor means; and a hydraulic control system including said pilot control valve for controlling the flow of fluid from said fluid pump to said motor means, said hydraulic control system including a pressure relief valve connected to said pilot control valve, first and second flow control valves and a switch valve, means connecting said first control valve to bypass a portion of the fluid delivered by said fluid pump in order to control the flow to said motor means, means connecting said second flow control valve through said switch valve to bypass fluid from said fluid pump, and means connecting said pilot control valve to said switch valve and to said fluid pump, said pilot control valve being constructed and arranged to render said pressure relief valve effective to limit the pressure of fluid delivered to said motor means to a predetermined low value insufficient to drive the motor means when both of said manually operated valves are closed, said pilot control valve being further constructed and arranged to render said pressure relief valve ineffective to limit the pressure of the fluid delivered to said motor means to said predetermined low value when one of said manually operated valves is open whereupon the pressure of the latter fluid becomes sufficient to drive said motor means in order to cause the rotary pump to pass food products from the hopper through the open manually operated valve, the speed of drive of said motor means with only one manually operated valve open being controlled by the amount of fluid bypassed by both of said flow control valves, said pilot control valve being further constructed and arranged to supply fluids from said fluid pump to said switch valve when both of said manually operated valves are opened, thereby rendering said switch valve effective to interrupt the bypass path through the second flow control valve to decrease the amount of fluid bypassed from the motor means so that the motor means is driven at greater speed in order to deliver food products from the rotary pump through both of the open manually operated valves.

9. In an apparatus for feeding food products into casings, the combination of an inlet hopper for receiving the food products and having a discharge outlet therein, a rotary pump having an inlet communicating with said discharge outlet and also having an outlet; first and second discharge means communicating with the pump outlet and each including a manually operated valve which may be opened and closed to control the flow of food products therethrough; a cam operably connected to each of said valves; a pilot control valve having a pair of movable valve elements therein respectively actuated by the two cams; fluid operated motor means operably connected to drive said rotary pump; means including a fluid pump for supplying fluid to said motor means; and a hydraulic control system including said pilot control valve for controlling the flow of fluid from said fluid pump to said motor means, said hydraulic control system being constructed and arranged to deliver a maximum amount of fluid to said motor means when both of said manually operated valves are open, to deliver a lesser amount of fluid to said motor means when only one of the manually operated valves is open, and to render the motor means ineffective to drive the pump when both of the manually operated valves are closed.

10. In an apparatus for stuffing meat products into casings, the combination of a pedestal having means therein forming a fluid reservoir and having a lengthwise dimension greater than its widthwise dimension, a vertically extending inlet hopper mounted on said pedestal at a position adjacent one end of the lengthwise dimension and having a lower throat portion, a fluid motor and gearing assembly mounted on said pedestal beneath said hopper, a pump mounted on said assembly and having an inlet communicating with said throat portion in order to pump meat products from said hopper to a pump outlet, a motor driven pump unit mounted on said pedestal at a position adjacent the other end of said lengthwise dimension for supplying fluid from said reservoir to said assembly in order to drive said pump, and outlet means connected to said pump outlet and extending upwardly from said pump and above said motor driven pump unit for discharging meat products delivered thereto by said pump.

11. In an apparatus for stuffing meat products into casings, the combination of a pedestal having means therein forming a fluid reservoir, a vertically extending inlet hopper mounted on said pedestal and having a lower throat portion, a fluid operated pump driving assembly mounted on said pedestal beneath said hopper, a pump mounted on said assembly and having an inlet communicating with said throat portion in order to pump meat products from said hopper to a pump outlet, a motor driven pump unit mounted on said pedestal at a position displaced from said hopper for supplying fluid from said reservoir to said assembly in order to drive said pump, and outlet means connected to said pump outlet and extending upwardly from said pump and above said motor driven pump unit for discharging meat products delivered thereto by said pump.

12. In an apparatus for stuffing meat products into casings, the combination of a vertically extending inlet hopper having a lower throat portion terminating in an exit opening leading laterally from said hopper, a pump unit having one side secured to said throat portion for pumping meat products from the exit opening to a pump outlet on the side of said pump unit opposite to said one side, discharge structure connected to said opposite side of said pump unit for receiving meat products delivered thereto by said pump unit, means providing an access opening adjacent the throat portion of said hopper aligned with the exit opening for permitting access to the throat portion and the exit opening for the purpose of cleaning, a door mounted for pivotal movement upon the hopper from a closed position covering said access opening to an opening to an open position wherein said access opening is opened, said pump unit having a pump body which is secured to said throat portion and which includes means defining a pump chamber having detachable pump impellers mounted therein, and a pump top cover mounted for pivotal movement about a horizontal axis adjacent said opposite side of said pump unit from a closed position closing the top of said pump chamber to an open position wherein said pump chamber and the impellers therein are exposed for cleaning purposes.

13. In an apparatus for feeding meat products into casings, the combination of a vertically extending inlet hopper having a lower throat portion terminating in an exit opening extending laterally from said hopper, a pump unit having one side secured to said throat portion for pumping meat products from the exit opening to a pump outlet on the side of said pump unit opposite to said one side, discharge structure connected to said opposite side of said pump unit for receiving meat products delivered thereto by said pump unit, said pump unit having a pump body secured to said throat portion and including a pump chamber having detachable pump impellers mounted therein, a pump top cover mounted for pivotal movement about a horizontal axis from a closed position closing the top of said pump chamber to an open position wherein said pump chamber and the impellers therein are exposed for cleaning purposes, and means for clamping said cover to said pump body when the cover is in closed position.

14. In an apparatus for stuffing meat products into casings, the combination of a vertically extending inlet hopper having a lower throat portion terminating in an exit opening, a pump unit communicating with said throat portion for pumping meat products from the exit opening to a pump outlet, discharge structure connected to said pump unit for receiving meat products delivered thereto by said pump unit, means providing an access opening adjacent the throat portion of said hopper for permitting access to the throat portion and the exit opening for the purpose of cleaning, a door mounted for pivotal movement from a closed position covering said access opening to an open position wherein said access opening is opened, said pump unit having a pump body secured on one side to said throat portion and including a pump chamber having detachable pump impellers mounted therein, a pump top cover mounted for pivotal movement about a horizontal axis adjacent the side of said pump body opposite to said one side, said cover being pivotable from a closed position closing the top of said pump chamber to an open position wherein said pump chamber and the impellers therein are exposed for cleaning purposes, and means for clamping said cover to said pump body when said cover is in closed position.

15. In an apparatus for stuffing meat products into casings, the combination of a vertically extending inlet hopper having a lower throat portion terminating in an exit opening, a pump unit communicating with said throat portion for pumping meat products from the exit opening to a pump outlet, discharge structure connected to said pump unit for receiving meat products delivered thereto by said pump unit, said pump unit having a pump body secured on one side to said throat portion and including a pump chamber having detachable pump impellers mounted therein, a pump top cover mounted for pivotal movement about a horizontal axis adjacent the side of said pump body opposite to said one side, said cover being pivotable from a closed position closing the top of said pump chamber to an open position wherein said pump chamber and the impellers therein are exposed for cleaning purposes, and means for clamping said cover to said pump body when said cover is in closed position.

16. In a continuous feeding apparatus for viscous materials, the combination which comprises pump means, a plurality of outlet means connected to receive material delivered by said pump means, each outlet means including valve means which may be opened and closed to control the flow of material therethrough, and means controlled by all of said valve means for automatically controlling the operation of the pump means to deliver material from said pump means directly to each of said outlets at a substantially constant flow rate irrespective of the number of valves that are open.

17. In an apparatus for stuffing meat products into casings, the combination of a vertically extending inlet hopper having a lower throat portion terminating in an exit opening leading laterally from said hopper, a pump unit having one side secured to said throat portion for pumping meat products from the exit opening to a pump outlet on the side of said pump unit opposite to said one side, discharge structure connected to said opposite side of said pump unit for receiving meat products delivered thereto by said pump unit, means providing an access opening adjacent the throat portion of said hopper aligned with the exit opening for permitting access to the throat portion and the exit opening for the purpose of cleaning, and a door movable from a closed position covering said access opening to an open position wherein said access opening is opened.

18. In an apparatus for stuffing meat products into casings, the combination of a pedestal having means therein forming a fluid reservoir, a vertically extending inlet hopper mounted on said pedestal and having a lower throat portion, a fluid operated pump driving assembly mounted on said pedestal beneath said hopper, a pump mounted on said assembly and having an inlet communicating with said throat portion in order to pump meat products from said hopper to a pump outlet, a motor driven pump unit mounted on said pedestal at a position displaced from said hopper for supplying fluid from said reservoir to said assembly in order to drive said pump, and outlet means connected to said pump outlet.

19. In an apparatus for stuffing meat products into casings, the combination of a pedestal having means therein forming a fluid reservoir and having a lengthwise dimension greater than its widthwise dimension, a vertically extending inlet hopper mounted on said pedestal at a position adjacent one end of the lengthwise dimension and having a lower throat portion, a fluid motor and gearing assembly mounted on said pedestal beneath said hopper, a pump mounted on said assembly and having an inlet communicating with said throat portion in order to pump meat products from said hopper to a pump outlet, a motor driven pump unit mounted on said pedestal at a position adjacent the other end of said lengthwise dimension for supplying fluid from said reservoir to said assembly in order to drive said pump, and outlet means connected to said pump outlet.

References Cited in the file of this patent
UNITED STATES PATENTS

| | | |
|---|---|---|
| 1,802,324 | Bartlett | Apr. 28, 1931 |
| 2,996,755 | Weber | Aug. 22, 1961 |
| 3,122,308 | Anderson et al. | Feb. 25, 1964 |